(12) United States Patent
Logunov et al.

(10) Patent No.: US 12,411,284 B2
(45) Date of Patent: Sep. 9, 2025

(54) LOW-LOSS COUPLING BETWEEN SINGLE-CORE AND MULTI-CORE FIBERS

(71) Applicant: CORNING INCORPORATED, Corning, NY (US)

(72) Inventors: Stephan Lvovich Logunov, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 346 days.

(21) Appl. No.: 17/948,733

(22) Filed: Sep. 20, 2022

(65) Prior Publication Data

US 2023/0106986 A1   Apr. 6, 2023

Related U.S. Application Data

(60) Provisional application No. 63/249,874, filed on Sep. 29, 2021.

(51) Int. Cl.
  *G02B 6/26* (2006.01)
  *G02B 6/02* (2006.01)
  *G02B 6/036* (2006.01)

(52) U.S. Cl.
  CPC ......... *G02B 6/262* (2013.01); *G02B 6/02042* (2013.01); *G02B 6/03633* (2013.01)

(58) Field of Classification Search
  CPC .. G02B 6/02042; G02B 6/262; G02B 6/0281; G02B 6/305; G02B 6/03633; G02B 6/03611
  See application file for complete search history.

(56) References Cited

U.S. PATENT DOCUMENTS 5,732,178 A * 3/1998 Terasawa ........... G02B 6/02042
                                                    385/127
5,852,701 A * 12/1998 Kato .................. G02B 6/03633
                                                    385/127

(Continued)

FOREIGN PATENT DOCUMENTS

JP      4247950 B2 *  4/2009  ......... G02B 6/02004
WO   2021/112016 A1     6/2021

OTHER PUBLICATIONS

English translation of JP-4247950-B2 (Year: 2009).*
H. Uemura et al., "Fused taper type fan-in/fan-out device for multicore EDF," Proc. OECC 2013, TuS1-4 (2013).
International Search Report and Written Opinion of the International Searching Authority; PCT/US2022/043191; dated Dec. 9, 2022; 12 pages; European Patent Office.

(Continued)

*Primary Examiner* — Uyen Chau N Le
*Assistant Examiner* — Darby M. Thomason
(74) *Attorney, Agent, or Firm* — Amy T. Lang

(57) ABSTRACT

A coupler including a first end that optically couples with a plurality of single-core optical fibers, a second end that optically couples with a multi-core optical fiber, and a plurality of cores that each extends from the first end to the second end. The plurality of cores comprising a first core such that an outer diameter of the first core at the first end is larger than an outer diameter of the first core at the second end. The coupler further includes an outer cladding surrounding the plurality of cores and extending from the first end to the second end such that an outer diameter of the outer cladding at the first end is larger than an outer diameter of the outer cladding at the second end. Additionally, the coupler is a single, contiguous, conical glass member that tapers from the first end to the second end.

17 Claims, 4 Drawing Sheets

(56) References Cited

U.S. PATENT DOCUMENTS

| | | | |
|---|---|---|---|
| 9,946,014 B2 | 4/2018 | Abedin et al. | |
| 11,156,781 B2* | 10/2021 | Kopp | G02B 6/262 |
| 11,850,679 B2* | 12/2023 | Kangastupa | B23K 26/32 |
| 2011/0280517 A1* | 11/2011 | Fini | G02B 6/262 |
| | | | 29/428 |
| 2013/0273240 A1* | 10/2013 | Holland | B29D 11/00663 |
| | | | 264/1.28 |
| 2014/0119694 A1* | 5/2014 | Abedin | G02B 6/02042 |
| | | | 385/43 |
| 2016/0245992 A1* | 8/2016 | Takenaga | G02B 6/02019 |
| 2018/0224607 A1 | 8/2018 | Bookbinder et al. | |
| 2022/0413221 A1* | 12/2022 | Arao | G02B 6/02042 |

OTHER PUBLICATIONS

Thomson et al; "Ultrafast-Laser Inscription of a Three Dimensional Fan-Out Device for Multicore Fiber Coupling Applications"; Optics Express, vol. 15, No. 18, pp. 11691-11697 (2007).

Watanabe et al; "Laminated Polymer Waveguide Fan-Out Device for Uncoupled Multi-Core Fibers"; Optics Express, vol. 20, No. 24, pp. 23617-26325 (2012).

Y. Tottoti et al., "Integrated optical connection module for 7-core multi-core fiber and 7 single mode fibers", Proc. IEEE Summer Topicals 2013, MC3.2, pp. 82-83.

Zhu et al; "Seven-Core Multicore Fiber Transmissions for Passive Optical Network"; Optics Express; vol. 18, No. 11, pp. 11117-11122 (2010).

* cited by examiner

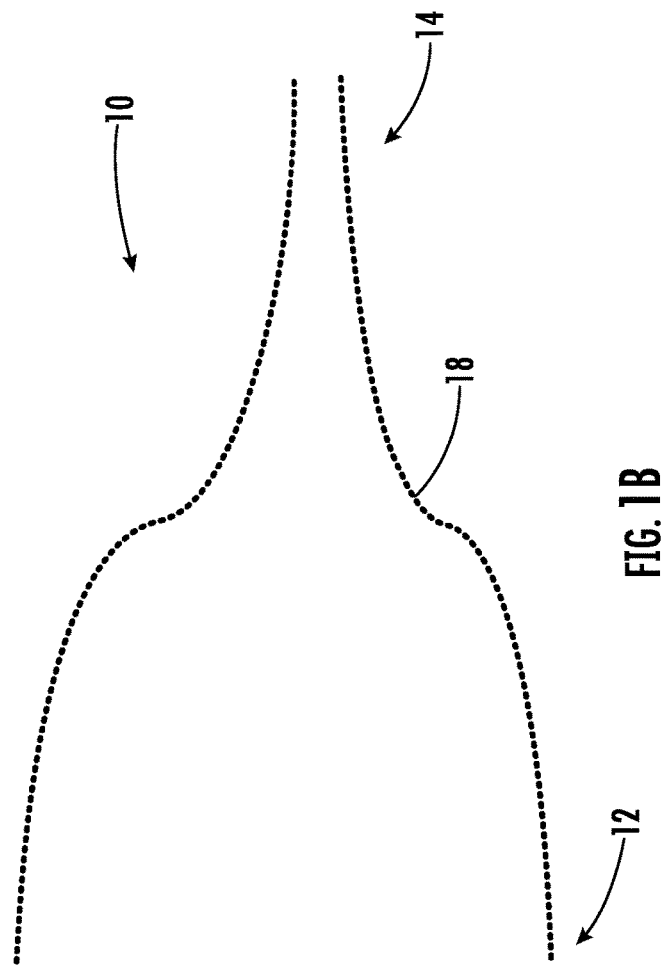
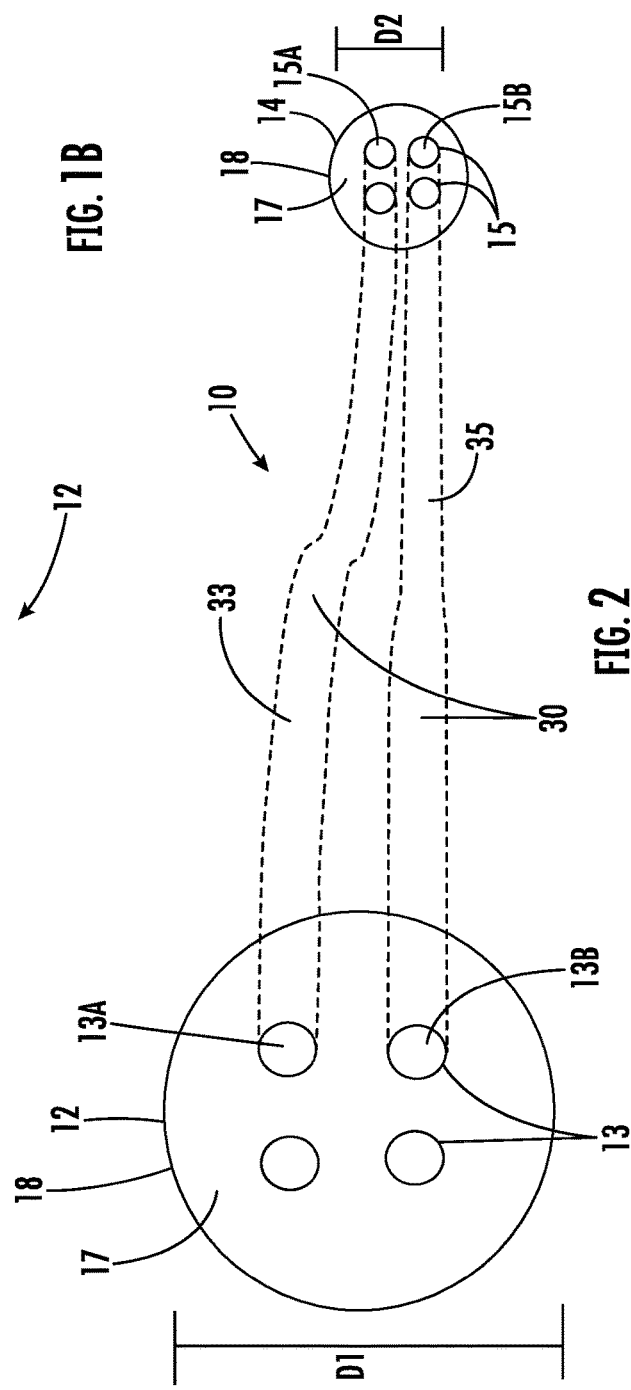
FIG. 1B
FIG. 2

LOW-LOSS COUPLING BETWEEN SINGLE-CORE AND MULTI-CORE FIBERS

This Application claims the benefit of priority to U.S. Provisional Patent Application Ser. No. 63/249,874 filed on Sep. 29, 2021, the content of which is relied upon and incorporated herein by reference in its entirety.

FIELD

The present disclosure relates to optical fibers and, more specifically, to low-loss coupling between single-core and multi-core optical fibers.

BACKGROUND

A standard single-core optical fiber includes a cladding that surrounds an inner core. Such single-core optical fibers are often used for long distance transmissions due to their fast transmission speeds. A multi-core optical fiber includes a plurality of cores all surrounded by the same common cladding. Thus, each core in a multi-core optical fiber can act as a separate waveguide so that light independently propagates through each core. Multi-core optical fibers increase the cable density and, thus, can reduce manufacturing costs compared to single-core optical fibers.

In fiber optic telecommunication systems, there is a growing trend towards expanding the transmission capabilities as data traffic continues to grow. Thus, there is a need in maximizing the transmission capacity per fiber. One approach is to use more multi-core fibers. Connections between previously installed single-core fibers and newly installed multi-core fibers is required in order to provide such increased capacity. Traditionally, fan-in/fan-out devices are used to provide such connections between single-core and multi-core fibers and include 3D waveguides, grating couplers on Si waveguide, and lens coupling apparatuses.

However, such traditional fan-in/fan-out devices typically are formed of discrete and separate fibers that are fused together at one end of the device. More specifically, the traditional devices are fused together at the end of the device that couples to a multi-core optical fiber. However, the separate fibers are not fused together at the end of the device that couples to the single-core fibers and, instead, remain as separate and discrete fibers at this end. Thus, the end of the device that couples to the single-core fibers is formed of different fibers, each with their own core, that diverge outward from each other to connect with different single-core fibers. Such results in bulky optics and complicated systems that are difficult to install and time consuming to manufacture. Furthermore, the positioning of the cores in the traditional fan-in/fan-out devices is based on fusing multiple fibers together, which is not very precise and may result in elevated insertion loss on the connector side that connects to the multi-core optical fiber.

SUMMARY

Embodiments of the present disclosure provide coupling between single-core and multi-core optical fibers. More specifically, embodiments of the present disclosure provide a coupler for coupling a plurality of single-core fibers with a multi-core fiber. The couplers disclosed herein comprise a unitary glass member (as opposed to separate fibers that are bundled together) that extends from the plurality of single-core fibers to the multi-core fiber. The unitary glass member is comprised of a plurality of cores all surrounded by the same outer cladding. Thus, the coupler disclosed herein optically couples the plurality of single-core fibers to the multi-core fiber with low coupling loss while providing high coupling coefficient interfaces. The coupler disclosed herein is assembled with the precision required to achieve precise alignment of the unitary glass member to the multi-core fiber. Furthermore, the couplers disclosed herein are easy to install and manufacture, thus reducing resources to produce such couplers.

According to a first aspect, a coupler is disclosed comprising a first end configured to optically couple with a plurality of single-core optical fibers, a second end configured to optically couple with a multi-core optical fiber, and a plurality of cores that each extends from the first end to the second end. The plurality of cores comprising a first core such that an outer diameter of the first core at the first end is larger than an outer diameter of the first core at the second end. Furthermore, the coupler comprises an outer cladding surrounding the plurality of cores and extending from the first end to the second end such that an outer diameter of the outer cladding at the first end is larger than an outer diameter of the outer cladding at the second end. The coupler also comprises a single, contiguous, conical glass member that tapers from the first end to the second end.

According to another aspect, a coupler is disclosed comprising a first end configured to optically couple with a plurality of single-core optical fibers, a second end configured to optically couple with a multi-core optical fiber, and a core that extends from the first end to the second end such that an outer diameter of the core at the first end is larger than an outer diameter of the core at the second end. The coupler further comprises an inner cladding and an outer cladding. The inner cladding surrounding the core and extending from the first end to the second end. The outer cladding surrounding the core and the inner cladding and extending from the first end to the second end such that an outer diameter of the outer cladding at the first end is larger than an outer diameter of the outer cladding at the second end. A relative refractive index of the core at the first end and at the second end is about 0.5% Δ to about 1.0% Δ, a relative refractive index of the inner cladding at the first end and at the second end is about 0.2% Δ to about 0.5% Δ, and a relative refractive index of the outer cladding at the first end and at the second end is about −0.20% Δ to about 0.20% Δ.

Additional features and advantages are set forth in the detailed description that follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures.

FIG. 1B is another schematic drawing of an exemplary coupler, according to embodiments disclosed herein;

FIG. 2 is a schematic cross-sectional view of the exemplary coupler of FIG. 1, according to embodiments disclosed herein;

DETAILED DESCRIPTION

Figure 1A:
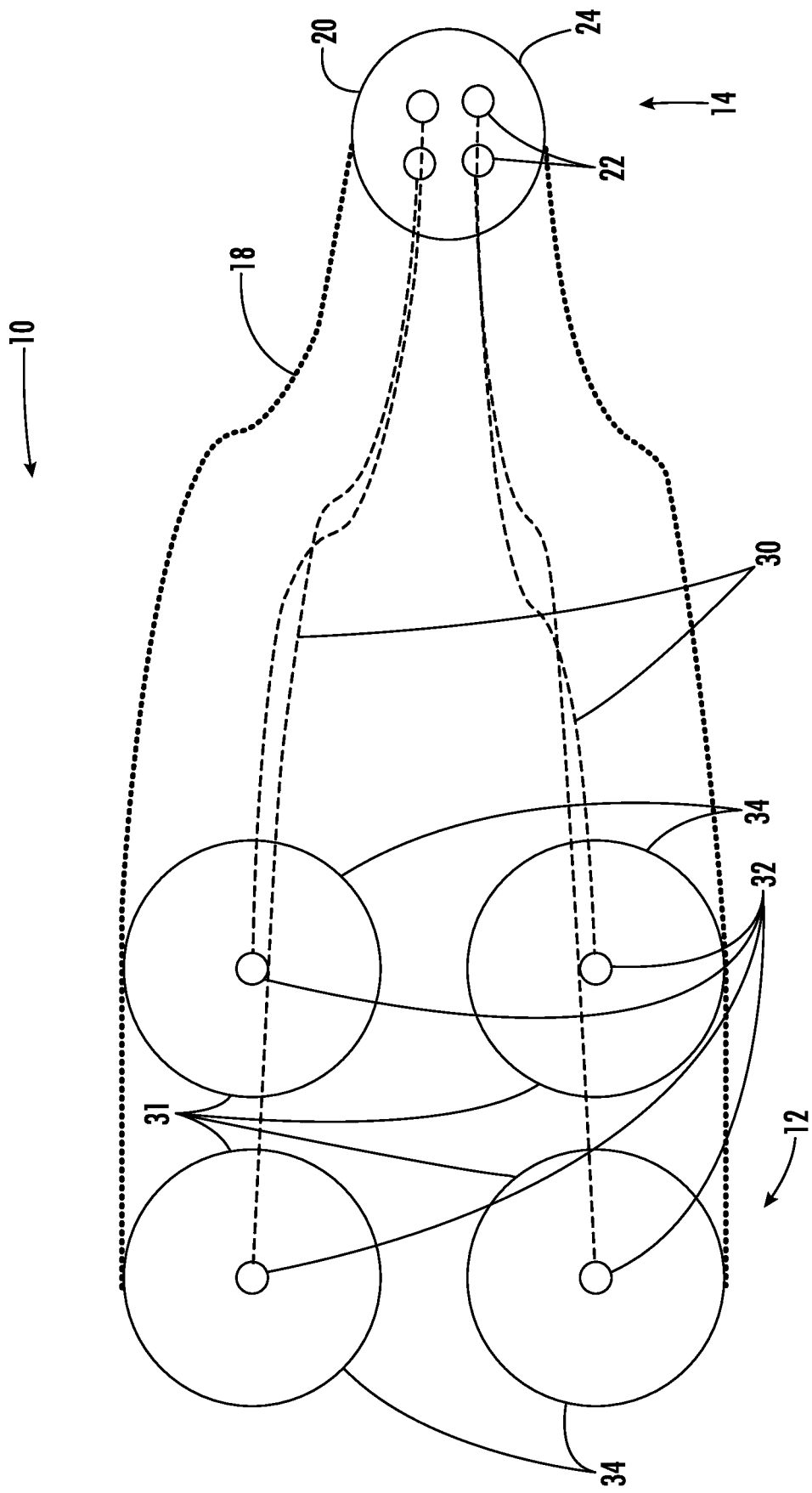
FIG. 1A is a schematic drawing of an exemplary coupler, according to embodiments disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Any relative terms like top, bottom, side, horizontal, vertical, etc., are used for convenience and ease of explanation and are not intended to be limiting as to direction or orientation.

The limits on any ranges cited herein are considered to be inclusive and thus to lie within the range, unless otherwise specified.

"Optical fiber" refers to a waveguide having a glass portion surrounded by a coating. The glass portion includes a core and a cladding, and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. Δ or Δ %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by equation (1) below, unless otherwise specified. Whether by design or a consequence of normal manufacturing variability, the dependence of relative refractive index on radial position may be sloped, curved, or otherwise non-constant.

"Relative refractive index," as used herein, is defined in equation (1) as:

$$\Delta_i(r_i)\% = 100\frac{(n_i^2 - n_{ref}^2)}{2n_i^2} \quad (1)$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by Δ (or "delta") or Δ % (or "delta %") and its values are given in units of "%", unless otherwise specified. Relative refractive index may also be expressed as Δ(r) or Δ(r) %.

The average relative refractive index ($\Delta_{ave}$) of a region of the fiber is determined from equation (2):

$$\Delta_{ave} = \int_{r_{inner}}^{r_{outer}} \frac{\Delta(r)dr}{(r_{outer} - r_{inner})} \quad (2)$$

where $r_{inner}$ is the inner radius of the region, $r_{outer}$ is the outer radius of the region, and Δ(r) is the relative refractive index of the region.

The refractive index of an optical fiber profile may be measured using commercially available devices, such as the IFA-100 Fiber Index Profiler (Interfiber Analysis LLC, Sharon, MA USA) or the S14 Refractive Index Profiler (Photon Kinetics, Inc., Beaverton, OR USA). These devices measure the refractive index relative to a measurement reference index, $n(r)-n_{meas}$, where the measurement reference index $n_{meas}$ is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index n(r) is then used to calculate the relative refractive index as defined by equation (1).

The term "α-profile" or "alpha profile" refers to a relative refractive index profile Δ(r) that has the functional form defined in equation (3):

$$\Delta(r) = \Delta(r_0)\left[1 - \left[\frac{|r-r_0|}{(r_z - r_0)}\right]^\alpha\right] \quad (3)$$

where $r_o$ is the radial position at which Δ(r) is maximum, $\Delta(r_0) > 0$, $r_z > r_0$ is the radial position at which Δ(r) decreases to its minimum value, and r is in the range $r_i \leq r \leq r_f$, where $r_i$ is the initial radial position of the α-profile, $r_f$ is the final radial position of the α-profile, and α is a real number. $\Delta(r_0)$ for an α-profile may be referred to herein as $\Delta_{max}$ or, when referring to a specific region i of the fiber, as $\Delta_{imax}$. When the relative refractive index profile of the fiber core region is described by an α-profile with $r_0$ occurring at the centerline (r=0), $r_z$ corresponding to the outer radius $r_1$ of the core region, and $\Delta_1(r_1)=0$, equation (3) simplifies to equation (4):

$$\Delta_1(r) = \Delta_{1\,max}\left[1 - \left[\frac{r}{r_1}\right]^\alpha\right] \quad (4)$$

The "mode field diameter" or "MFD" of an optical fiber is defined in equation (5) as:

$$MFD = 2w \quad (5)$$

$$w^2 = 2\frac{\int_0^\infty (f(r))^2 r\,dr}{\int_0^\infty \left(\frac{df(r)}{dr}\right)^2 r\,dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in equation (6) as:

$$A_{eff} = \frac{2\pi\left[\int_0^\infty (f(r))^2 r\,dr\right]^2}{\int_0^\infty (f(r))^4 r\,dr} \quad (6)$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

"Cable cutoff wavelength," or "cable cutoff," as used herein, refers to the 22 m cable cutoff test as specified by the IEC 60793-1-44 standard, "Measurement methods and test procedures—Cut-off wavelength."

The term "up-dopant," as used herein, refers to a dopant which raises the refractive index of glass relative to pure, undoped $SiO_2$. The term "down-dopant," as used herein, is a dopant which has a propensity to lower the refractive index of glass relative to pure, undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

Reference will now be made in detail to illustrative embodiments of the present description.

FIG. 1A is a schematic drawing of an exemplary coupler 10 that couples a multi-core optical fiber 20 with a plurality of single-core optical fibers 31. Due to its connection between such multi-core and single-core optical fibers 20, 31, coupler 10 may also be referred to as a fan-in/fan-out device. As shown in FIG. 1A, each single-core optical fiber 31 comprises a center core 32 surrounded by at least an outer cladding 34. The multi-core optical fiber 20 comprises two or more cores 22 all surrounded by at least a common cladding 24. Coupler 10 provides an optical connection between multi-core optical fiber 20 and each of single-core optical fibers 31. More specifically, coupler 10 optically couples a core 32 with each of cores 22.

The exemplary multi-core fiber 20 shown in FIG. 1A has a 2×2 configuration, but coupler 10 can be similarly used with other multi-core fibers designs such as, for example, a 1×4 configuration (e.g., four cores are aligned in a single line) or 6 cores forming a hexagonal shape, or 7 cores forming a hexagonal shape with a single core in the center.

As further shown in FIG. 1A, coupler 10 comprises a first end 12 for connection to single-mode optical fibers 31 and a second end 14 for connection to multi-core optical fiber 20. Coupler 10 comprises a plurality of cores 30 that each extend from first end 12 to second end 14. FIGS. 1A and 1B schematically show an outer surface 18 of coupler 10 that surrounds the inner cores 30 and that also extends from first end 12 to second 14. Because cores 30 are each contained entirely within outer surface 18 along the entire length of coupler 10 and are part of a single, solid glass structure, coupler 10 may also be referred to as a unitary glass member. Furthermore, coupler 10 may be referred to as a single conical member that tapers along outer surface 18. "Conical" may be referred to herein as having a cone shape. However, it is noted that "conical," as used herein, does not require that the sides of the shape be parallel to each other or that each side be in a single plane. It is further noted that coupler 10 comprises a single, contiguous, glass member that tapers from first end 12 to second end 14.

Figure 4:
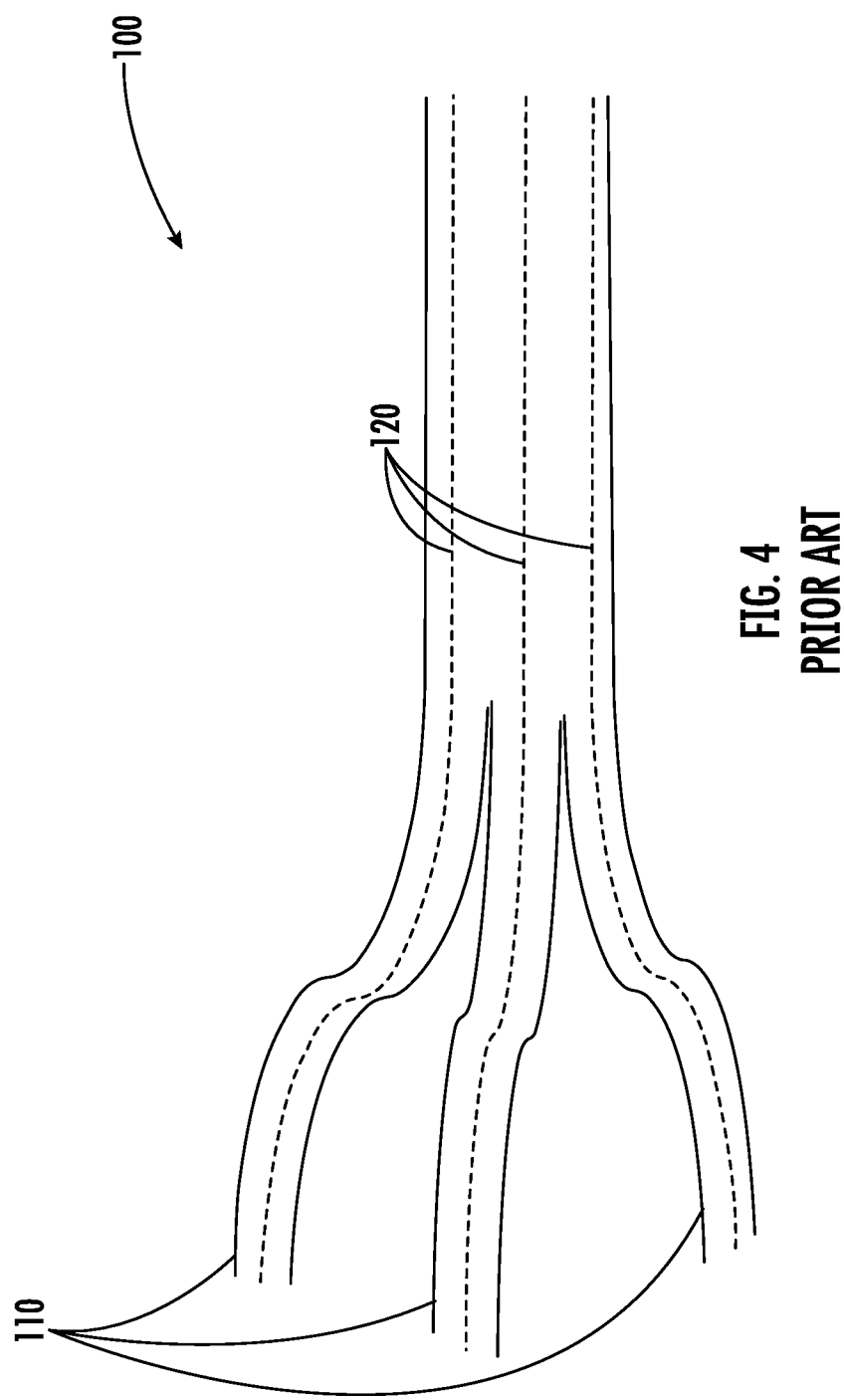
FIG. 4 depicts a prior art fan-in/fan-out device.

Such a conical coupler formed of a unitary glass member is in contrast to traditional fan-in/fan-out devices, such as device 100 shown in FIG. 4, which are formed of a plurality of discrete and separate fibers 110, each with their own core 120, that are fused together at one end of the device and that diverge outward from each other at the other end of the device. Thus, the traditional devices are formed of multiple cylindrical members (the separate fibers 110). According to the embodiments disclosed herein, coupler 10 is formed of a single common cladding (as discussed further below) that surrounds each core 30 and that extends from first end 12 to second end 14. Thus, coupler 10 may be a single conical member with a plurality of cores. As also discussed further below, the outer diameter of outer surface 18 and the outer diameter of each of the cores 30 taper down in size from first end 12 to second end 14 to form the conical shape.

Referring now to FIG. 2, which shows a cross-sectional view of coupler 10, cores 30 at first end 12 of coupler 10 each form a core 13 that is optically connected to a separate core 32 of single-core fibers 31. Cores 30 at second end 14 of coupler 10 each form a core 15 such that cores 15 are connected to the same multi-core fiber 20. Thus, cores 15 are each connected to a core 22 of multi-core optical fiber 20.

As discussed further below, coupler 10 may be referred to as having a double clad fiber taper because it not only tapers in size from first end 12 to second end 14, but coupler 10 also comprises both an inner cladding and an outer cladding surrounding the cores along a length of coupler 10. Such a configuration of coupler 10 helps to provide low coupling loss between single-mode optical fibers 31 and multi-core optical fiber 20.

First end 12 of coupler 10 may be attached to single-core fibers 31 through any well-known attachment means such as, for example, a butt couple. Similarly, second end 14 of coupler 10 may be attached to multi-core fiber 20 through any well-known attachment means such as, for example, a butt couple or splicing. In some embodiments, the butt couple at second end 14 includes a multi-fiber connector for connection to multi-core optical 20.

Cores 30 (and, thus, cores 13 and 15) may each be glass bodies formed of, for example, silica glass that is either un-doped silica glass, up-doped silica glass, and/or down-doped silica glass. Up-doped silica glass includes silica glass doped with, for example, germanium (e.g., $GeO_2$), phosphorus (e.g., $P_2O_5$), aluminum (e.g. $Al_2O_3$), chlorine, or an alkali metal oxide (e.g. $Na_2O$, $K_2O$, $Li_2O$, $Cs_2O$, or $Rb_2O$). In some embodiments, the cores comprise germanium doped glass having a germanium concentration between about 7 wt. % and about 14 wt. %.

An outer cladding 17 may surround cores 30 (and, thus, cores 13, 15) such that outer cladding 17 is continuously disposed between first end 12 and second end 14. Outer cladding 17 may surround cores 30 along an entire length of coupler 10. An outer surface of outer cladding 17 may from outer surface 18 of coupler 10. In other embodiments, one or more coatings may be disposed on outer cladding 17 such that an outer surface of the outermost coating forms outer surface 18 of coupler 10. As discussed further below, cores 30 each have a higher relative refractive index than outer cladding 17. In some embodiments outer cladding 17 has a discernible core-cladding boundary with cores 30. However, it is also contemplated that outer cladding 17 can lack a distinct boundary with cores 30. As further discussed below, an inner cladding may be disposed between cores 13, 15 and outer cladding 17. In such embodiments, the refractive index of the cores ($\Delta_{1,max}$ %), inner cladding ($\Delta_2$%) and outer cladding ($\Delta_3$%) follows the relation $\Delta_{1,max}$ %>$\Delta_2$%>$\Delta_3$% and |($\Delta_{1,max}$%−$\Delta_2$%)−($\Delta_2$%−$\Delta_3$%)|<0.04% Δ.

Coupler 10 provides a continuous optical pathway between cores 13 at first end 12 and cores 15 at second end 14. Thus, cores 13 and cores 15 are in optical communication with each other. Furthermore, each core 13 at first end 12 may be an extension of and form a unitary member with a core 15 at second end 14. For example, as shown in FIG. 2, a first core end 13A at first end 12 may directly contact with and be an extension of a second core end 15A at second end 14. First and second core ends 13A, 15A may therefore form one core member (i.e., a first core 33) that extends from first end 12 to second end 14 of coupler 10. First core 33 may be formed of a single material or a plurality of materials. Furthermore, it is also contemplated that first core 33 may be formed of different components or segments. As discussed further below, the diameter of first core end 13A may be greater than the diameter of second core end 15A so that the cylindrical material of first core 33 tapers from first core end 13A to second core end 15A. For example, the silica cylindrical member of first core end 13A may taper along coupler 10 to form second core end 15A, thus forming a conical shape. First core end 13A and second core end 15A are formed of the same conical member and are in direct contact with each.

As a further example, as also shown in FIG. 2, a first core end 13B at first end 12 may directly contact with and be an extension of a second core end 15B at second end 14. First and second core ends 13B, 15B may therefore form one core member (i.e., a second core 35) that extends from first end 12 to second end 14 of coupler 10. Second core 35 may be formed of a single material or a plurality of materials. Furthermore, it is also contemplated that second core 35 may be formed of different components or segments. As discussed further below, the diameter of first core end 13B may be greater than the diameter of second core end 15B so that the cylindrical material of second core 35 tapers from first core end 13B to second core end 15B. For example, the silica cylindrical member of first core end 13B may taper along coupler 10 to form second core end 15B, thus forming the conical shape. First core end 13B and second core end 15B are formed of the same conical member and are in direct contact with each.

It is further noted that the configuration of multi-core fiber 20 may be different from what is shown in FIG. 1A. For example, multi-core fiber 20 may have different designs and configurations of its cores than the exemplary embodiment of FIG. 1A. Thus, second end 14 of coupler 10 may also have different designs and configurations based upon the configuration of multi-core fiber 20. Furthermore, first end 12 of coupler 10 may also have different designs and configurations based upon the designs and configurations of single-core fibers 31.

In some embodiments, the cores 30 of coupler 10 are arranged in a 2×2 configuration, as shown in FIG. 2. In other embodiments, the cores 20 of coupler 10 are arranged in a 1×2 configuration. In still other embodiments, the cores 30 of coupler 10 are arranged in a 1×4 configuration. In yet other embodiments, the cores 30 of coupler 10 comprise 7 cores with one core at the center of the coupler 10 and six other cores configured in a hexagonal pattern. In general, coupler designs disclosed herein can be generalized to any multi-core configuration, with the redraw ratio (as discussed below) and core design optimized for the multi-core configuration of interest.

In certain embodiments, as shown in FIG. 2, a ratio of the outer diameter of cores 13 at first end 15 to the outer diameter of cores 15 at second end 15 of coupler 10 may be at least about 3, or at least about 4, or at least about 5. The ratio may be in a range from about 3 to about 20, or about 5 to about 18, or about 7 to about 17, or about 8 to about 14, or about 7.5 to about 9.5, or about 8 to about 9, or about 8.4 to about 8.8. In some embodiments, the ratio is about 7.96, or about 8.74, or about 8.89, or about 9.76.

Outer cladding 17 may also form one unitary member that extends from first end 12 to second end 14. As shown in FIG. 2, outer cladding 17 also tapers from first end 12 to second end 14, thus forming the conical shape of coupler 10. As discussed further below, the outer diameter of outer cladding 17, and thus of coupler 10, decreases from first end 12 to second end 14.

As shown in FIG. 2, first end 12 of coupler 10 may have a larger outer diameter than second end 14 of coupler 10. Thus, the outer diameter of coupler 10 (and, thus, of outer cladding 17) may taper from first end 12 to second end 14. In some embodiments, first end 12 of coupler 10 (and of outer cladding 17) has an outer diameter D1 of about 5 mm or less, or about 4 mm or less, or about 3 mm or less, or about 2 mm or less, or about 1.75 mm or less, or about 1.5 mm or less, or about 1.25 mm or less, or about 1.2 mm or less, or about 1.15 mm or less, or about 1.10 mm or less, or about 1.08 mm or less, or about 1.05 mm or less, or about 1.02 mm or less, or about 1 mm or less, or about 0.8 mm or less, or about 0.75 mm or less, or about 0.5 mm or less. Additionally or alternatively, the outer diameter D1 of first end 12 of coupler may be about 0.25 mm or greater, or about 0.5 mm or greater, or about 0.75 mm or greater, or about 1 mm or greater, or about 1.02 mm or greater, or about 1.05 mm or greater, or about 1.08 mm or greater, or about 1.10 mm or greater, or about 1.15 mm or greater, or about 1.25 mm or greater, or about 1.5 mm or greater. In some embodiments, the diameter D1 is in a range from about 1 mm to about 2 mm or from about 1.1 mm to about 1.3 mm.

Second end 14 of coupler 10 (and of outer cladding 17) may have an outer diameter D2 of about 50 microns or greater, or about 65 microns or greater, or about 70 microns or greater, or about 100 microns or greater, or about 125 microns or greater, or about 150 microns or greater, or about 165 microns or greater, or about 180 microns or greater, or about 200 microns or greater, or about 225 microns or greater. Additionally or alternatively, the outer diameter D2 of second end 14 may be about 250 microns or less, or about 225 microns or less, or about 200 microns or less, or about 180 microns or less, or about 165 microns or less, or about 150 microns or less, or about 125 microns or less, or about 100 microns or less, or about 70 microns or less. In some embodiments, the diameter D2 is 125 microns.

A redraw ratio (i.e., D1/D2) may be at least about 3, or at least about 4, or at least about 5. The redraw ratio may be in a range from about 3 to about 20, or about 5 to about 18, or about 7 to about 17, or about 8 to about 14, or about 7.5 to about 9.5, or about 8 to about 9, or about 8.4 to about 8.8. In some embodiments, the redraw ratio is about 7.96, or about 8.74, or about 8.89, or about 9.76. It is noted that in some embodiments, the redraw ratio is the same as the ratio of the diameter of cores 13 at first end 12 to the diameter of cores 15 at second end 14 (as discussed above). Thus, in these embodiments, cores 30 taper in size from first end 12 to second end 14 the same amount as the outer diameter of coupler 10 tapers in size from first end 12 to second end 14. In general, the design of couplers 10 disclosed herein can be generalized to any multi-core core configuration, with the redraw ratio and core design optimized for the multi-core configuration of interest.

As noted above, coupler 10 may have a different design and configuration than the embodiment provided in FIG. 2. Such different designs and configurations may require a different design of coupler 10 provided, however, that the distance between cores 13 at first end 12 should be, in embodiments, 125 microns or greater. Such reduces any crosstalk between the cores 13. Furthermore, if the distance between the cores 13 at first end 12 is less than 12 microns, such may prevent the cores 13 from connecting to the individual cores 32 of the single-core fibers 31 due to space constraints. Therefore, the redraw ratio (D1/D2) of coupler 10 should satisfy equation (7) below:

$$\text{Redraw Ratio} \geq (125+Y)/X \quad (7)$$

where (125+Y) is the spacing (in microns) between cores 13 at first end 12 of coupler 10 and X is the spacing (in microns) between cores 15 at second end 14 of coupler 10. In equation (7), Y is 0 or greater, or 1 or greater, or 5 or greater, or 10 or greater. Additionally or alternatively, Y is 125 or less, or 115 or less, or 100 or less. Therefore, Y may be in a range from 0 to 125. Such provides the spacing between cores 13 at first end 12 to be 125 microns or greater. Furthermore, in equation (7), X is 10 microns or greater, or 15 microns or greater, or 20 microns or greater, or 25 microns or greater, or 30 microns or greater, or 35 microns or greater. In some embodiments, X is greater than 20 microns to avoid cross coupling between cores 15. It is further noted that equation (7) above provides the parameters for the redraw ratio.

A length (L) of coupler 10 (from first end 12 to second end 14) may be about 100 mm or less, or about 75 mm or less, or about 50 mm or less, or about 25 mm or less, or about 20 mm or less, or about 15 mm or less, or about 10 mm or less, or about 5 mm or less, or about 2 mm or less. Additionally or alternatively, the length of coupler 10 may be about 1 mm or greater, or about 2 mm or greater, or about 5 mm or greater, or about 10 mm or greater, or about 15 mm or greater, or about 20 mm or greater, or about 25 mm or greater, or about 50 mm or greater, or about 75 mm or greater. In some embodiments, the length of coupler 10 is from about 1 mm to about 100 mm, or from about 2 mm to about 50 mm, or from about 3 mm to about 25 mm, or from about 5 mm to about 20 mm. When defining $D_{max}$ as the maximum core diameter over the tapered length L of coupler 10 and $D_{min}$ as the minimum core diameter over the tapered length L of coupler 10, in some embodiments, the parameter $(D_{max}-D_{min})/L$ is less than 100 microns/mm. In other embodiments, the parameter $(D_{max}-D_{min})/L$ is less than 50 microns/mm. In yet other embodiments, the the parameter $(D_{max}-D_{min})/L$ is less than 25 microns/mm.

Figure 3:
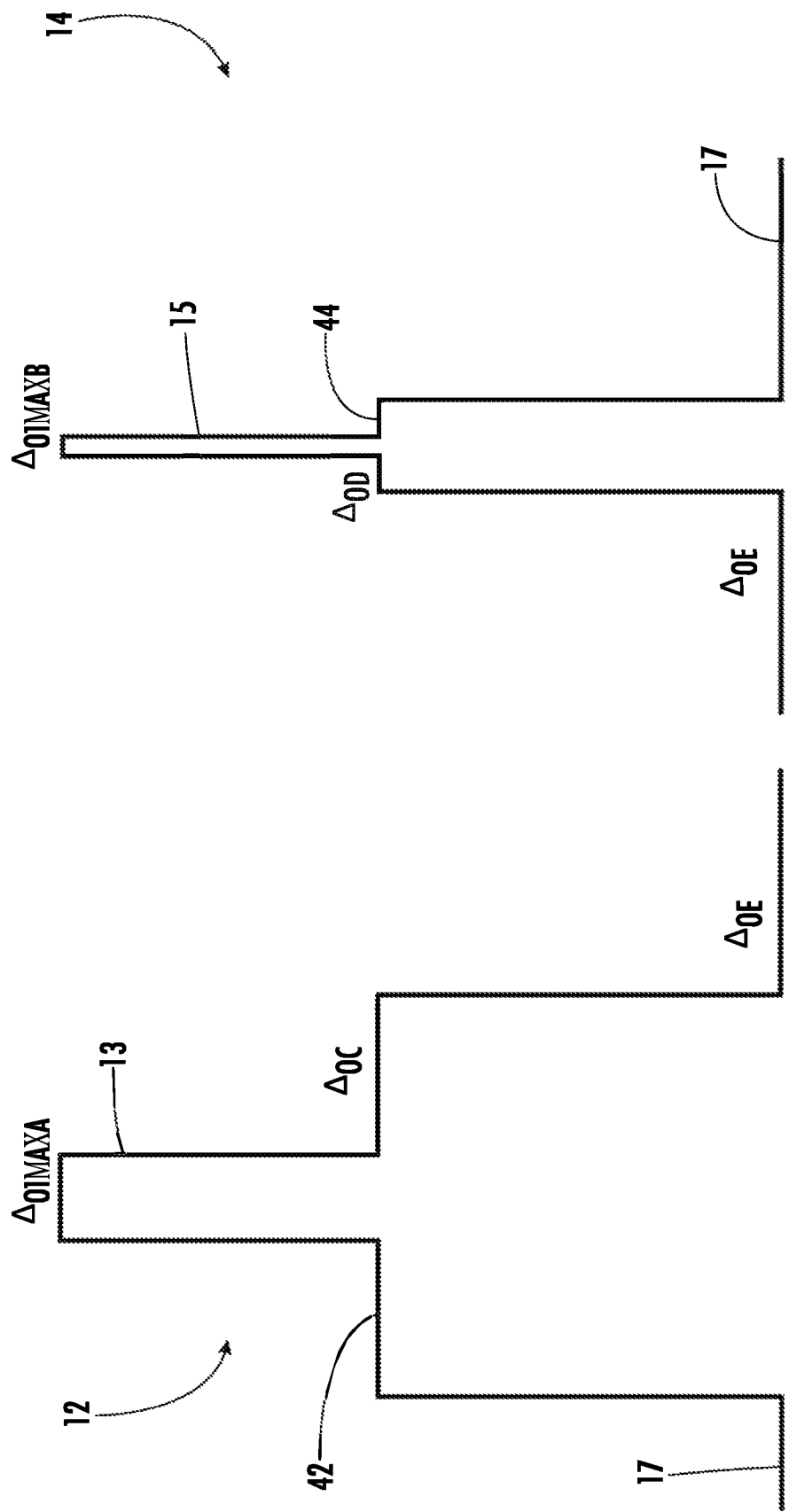
FIG. 3A depicts a relative refractive index profile of a first end of the coupler of FIG. 1, according to embodiments disclosed herein.
FIG. 3B depicts a relative refractive index profile of a second end of the coupler of FIG. 1, according to embodiments disclosed herein.

FIG. 3A plots an idealized relative refractive index profile of first end 12 of coupler 10 as the relative refractive index Δ versus the radial coordinate r. Furthermore, FIG. 3B plots an idealized relative refractive index profile of second end 14 of coupler 10 as the relative refractive index Δ versus the radial coordinate r. As further shown in FIG. 3A, at first end 12 of coupler 10, cores 13 are radially surrounded by an inner cladding 42, which is then radially surrounded by outer cladding 17. Cores 13 have a higher relative refractive index than inner cladding 42, and inner cladding 42 has a higher relative refractive index than outer cladding 17. Inner cladding 42 may also be referred to as a pedestal. In some embodiments, the refractive index of the core ($\Delta_{1,max}$ %), inner cladding ($\Delta_2$%) and outer cladding ($\Delta_3$%) follow the relation $\Delta_{1,max}\% > \Delta_2\% > \Delta_3\%$ and $|(\Delta_{1,max}\%-\Delta_2\%)-(\Delta_2\%-\Delta_3\%)| < 0.04\% \Delta$.

As further shown in FIG. 3B, at second end 14 of coupler 10, cores 15 are radially surrounded by an inner cladding 44, which is then radially surrounded by outer cladding 17. Cores 15 have a higher relative refractive index than inner cladding 44, and inner cladding 44 has a higher relative refractive index than outer cladding 17. Inner cladding 44 may also be referred to as a pedestal.

At first end 12, light is guided by cores 13 and is confined within cores 13 by inner cladding 42. As coupler 10 tapers and decreases in size, less light is confined within the cores such that the light is also guided by the inner cladding. Therefore, inner cladding 44 at second end 14 of coupler 10 guides the light within the coupler, along with cores 15. Inner cladding 44 at second end 14 effectively acts as an outer core region and core 15 at second end 14 effectively acts as an inner core region.

Cores 13 at first end 12 each have a relative refractive index $\Delta_{01maxA}$ in a range from 0.5% Δ to about 1.0% Δ, or from about 0.6% Δ to about 0.8% Δ, or from about 0.65% Δ to about 0.75% Δ, or from about 0.68% Δ to about 0.7% Δ. In some embodiments, the relative refractive index $\Delta_{01maxA}$ is about 0.68% Δ or about 0.72% Δ.

Cores 15 at second end 14 each have a relative refractive index $\Delta_{01maxB}$ in a range from 0.5% Δ to about 1.0% Δ, or from about 0.6% Δ to about 0.8% Δ, or from about 0.65% Δ to about 0.75% Δ, or from about 0.68% Δ to about 0.7% Δ. In some embodiments, the relative refractive index $\Delta_{01maxB}$ is about 0.68% Δ or about 0.72% Δ. The relative refractive index $\Delta_{01maxA}$ may be the same or different from the relative refractive index $\Delta_{01maxB}$.

Inner cladding 42 at first end 12 may have a relative refractive index $\Delta_{0C}$, which may be less than the relative refractive index $\Delta_{01maxA}$ of cores 13. The relative refractive index $\Delta_{0c}$ may range from 0.2% $\Delta$ to about 0.5% $\Delta$, or from about 0.3% $\Delta$ to about 0.4% $\Delta$, or from about 0.32% $\Delta$ to about 0.38% $\Delta$, or from about 0.34% $\Delta$ to about 0.36% $\Delta$. In some embodiments, the relative refractive index is about 0.34% $\Delta$ or about 0.36% $\Delta$.

Inner cladding 44 at second end 14 may have a relative refractive index $\Delta_{0D}$, which may be less than the relative refractive index $\Delta_{01maxB}$ of cores 15 and less than the relative refractive index $\Delta_{01maxA}$ of cores 13. The relative refractive index $\Delta_{0D}$ may range from 0.2% $\Delta$ to about 0.5% $\Delta$, or from about 0.3% $\Delta$ to about 0.4% $\Delta$, or from about 0.32% $\Delta$ to about 0.38% $\Delta$, or from about 0.34% $\Delta$ to about 0.36% $\Delta$. In some embodiments, the relative refractive index is about 0.34% $\Delta$ or about 0.36% $\Delta$. The relative refractive index $\Delta_{0D}$ of inner cladding 44 may be the same or different from the relative refractive index $\Delta_{0c}$ of inner cladding 42.

Cores 13 at first end 12 may each have a radius from about 3 microns to about 10 microns, or from about 4 microns to about 8 microns, or from about 4.5 microns to about 6 microns, or from about 5 microns to about 5.5 microns. In some embodiments, the radius of cores 13 may be about 4.1 microns, or about 4.2 microns, or about 4.5 microns, or about 4.6 microns, or about 4.7 microns.

As shown in FIGS. 3A and 3B, the radius of cores 15 at second end 14 may be smaller than the radius of cores 13 of first end 12. Cores 15 at second end 14 may each have a radius of about 0.4 microns to about 1 micron, or about 0.5 microns to about 0.9 microns, or about 0.6 microns to about 0.8 microns, or about 0.65 microns to about 0.7 microns. In some embodiments, the radius of cores 15 may be about 0.43 microns, or about 0.47 microns, or about 0.52 microns, or about 0.58 microns.

Additionally, inner cladding 42 at the larger end of the taper (i.e., at first end 12) may have a radius of about 35 microns or greater, or about 40 microns or greater, or about 45 microns or greater. In some embodiments, the radius of inner cladding 42 at the larger end of the taper is in a range from about 35 microns to about 60 microns, or from about 40 microns to about 55 microns, or from about 45 microns to about 50 microns. In some embodiments, the radius of inner cladding 42 at the larger end of the taper is about 35 microns, or about 40 microns, or about 45 microns. The radius of inner cladding 42 at the larger end of the taper is 35 microns or greater in order to prevent higher order modes from propagating within inner cladding 42. When the radius of inner cladding 42 is less than 35 microns, higher order modes can propagate within the inner cladding, which results in an increase in the cutoff wavelength of coupler 10 and can negatively impact the single mode operation of the system.

Additionally, inner cladding 44 at the smaller end of the taper (i.e., at second end 14) may have a radius ranging from about 3 microns to about 6 microns, or from about 3.5 microns to about 5.5 microns, or from about 4 microns to about 5 microns. In some embodiments, the radius of inner cladding 44 at the smaller end of the taper is about 4 microns, or about 4.1 microns, or about 4.5 microns. As shown in FIGS. 3A and 3B, the radius of inner cladding 44 at the smaller end of the taper may be smaller than the radius of inner cladding 42 at the larger end of the taper.

As also shown in FIGS. 3A and 3B, the radius of inner cladding 42 is greater than the radius of core 13 and greater than the radius of core 15. Similarly, the radius of inner cladding 44 is greater than the radius of core 13 and greater than the radius of core 15.

Because cores 13 and 15 comprise both an inner cladding and an outer cladding, coupler 10 may be referred to as having a double cladding. Such a double cladding provides reduced insertion loss of the optical signal when coupling single-core fibers 31 with multi-core fiber 20, as discussed further below. It is also noted that the double cladding of coupler 10 extends from first end 12 to second end 14. Thus, for example with reference to FIG. 2, first and second cores 33, 35 may comprise both an inner cladding and an outer cladding along their entire length.

Outer cladding 17 may have a relative refractive index $\Delta_{0E}$ in a range from about −0.20% $\Delta$ to about 0.20% $\Delta$, or about −0.15% $\Delta$ to about 0.15% $\Delta$, or about −0.10% $\Delta$ to about 0.10% $\Delta$, or about −0.05% $\Delta$ to about 0.05% $\Delta$. In some embodiments, the relative refractive index $\Delta_{0E}$ is about 0.0% $\Delta$. Thus, the relative refractive index $\Delta_{0E}$ is less than the relative refractive indices of each of cores 13, cores 15, inner cladding 42, and an inner cladding 44.

Cores 30 (and, thus, 13 and cores 15) may each have an alpha value of about 5 or less. In other embodiments, the alpha value is about 10 or greater. In some embodiments, the alpha value of cores 13 and/or cores 15 is about 12.

Cores 30 (and, thus, 13 and cores 15) may each have a mode field diameter, at 1310 nm wavelength, of about 8.2 microns or greater, or about 8.6 microns or greater, or about 9.0 microns or greater, or about 9.1 microns or greater, or about 9.2 microns or greater, or about 9.3 microns or greater, or about 9.4 microns or greater, or about 9.5 microns or greater, or about 9.6 microns or greater. In some embodiments, the mode field diameter is in a range from about 8.2 microns to about 9.7 microns, or from about 8.6 microns to about 9.6 microns, or from about 9.0 microns to about 9.5 microns. For example, the mode field diameter, at 1310 nm wavelength, for cores 13 and/or cores 15 is about 8.64 microns, or about 8.66 microns, or about 8.73 microns, or about 8.72 microns, or about 9.12 microns, or about 9.15 microns, or about 9.16 microns, or about 9.20 microns, or about 9.26 microns, or about 9.27 microns.

Additionally, cores 30 may each have a mode field diameter, at 1550 nm wavelength, of about 9.0 microns or greater, or about 9.5 microns or greater, or about 10.0 microns or greater, or about 10.1 microns or greater, or about 10.2 microns or greater, or about 10.3 microns or greater, or about 10.4 microns or greater. In some embodiments, the mode field diameter is in a range from about 9.9 microns to about 10.4 microns, or from about 10.0 microns to about 10.3 microns. For example, the mode field diameter, at 1550 nm wavelength, for cores 13 and/or cores 15 is about 9.87 microns, or about 9.94 microns, or about 9.98 microns, or about 10.0 microns, or about 10.28 microns, or about 10.32 microns, or about 10.38 microns, The effective area of cores 30 at 1310 nm wavelength may be about 70.0 micron$^2$ or less, or about 69.0 micron$^2$ or less, or about 68.0 micron$^2$ or less, or about 67.0 micron$^2$ or less, or about 66.0 micron$^2$ or less, or about 65.0 micron$^2$ or less, or about 64.0 micron$^2$ or less, or about 63.0 micron$^2$ or less, or about 62.0 micron$^2$ or less, or about 61.0 micron$^2$ or less, or about 60.0 micron$^2$ or less. In some embodiments, the effective are at 1310 nm wavelength is about 58.06 micron$^2$, or about 58.17 micron$^2$, or about 59.18 micron$^2$, or about 59.74 micron$^2$, or about 65.56 micron$^2$, or about 65.91 micron$^2$, or about 66.35 micron$^2$.

The cores 30 also have an effective area, at 1550 nm wavelength, of about 70 micron$^2$ or greater, or about 75 micron² or greater, or about 78 micron² or greater, or about 80 micron² or greater, or about 82 micron² or greater, or about 85 micron² or greater, or about 87 micron² or greater. Additionally or alternatively, the effective area, at 1550 nm wavelength, is about 95 micron² or less, or about 90 micron² or less, or about 85 micron² or less. In some embodiments, the effective area at 1550 nm wavelength is in range between 70 micron² and about 90 micron². In some embodiments, the effective area at 1550 nm wavelength is about 73.95 micron², or about 75.28 micron², or about 75.3 micron², or about 75.82 micron², or about 81.16 micron², or about 81.95 micron², or about 82.42 micron².

The cable cutoff of cores 30 disclosed herein is about 1300 nm or less, or about 1260 nm or less, or about 1250 nm or less, or about 1240 nm or less, or about 1230 nm or less, or about 1220 nm or less, or about 1210 nm or less, or about 1205 nm or less, or about 1200 nm or less, or about 1195 nm or less, or about 1190 nm or less, or about 1185 nm or less, or about 1180 nm or less, or about 1175 nm or less, or about 1170 nm or less. For example, the cable cutoff is about 1239 nm, or about 1171 nm, or about 1153 nm, or about 1121 nm, or about 1093 nm, or about 1064 nm.

The cutoff wavelength of the LP11 mode of cores 30 disclosed herein is about 1400 nm or less, or about 1300 nm or less, or about 1260 nm or less, or about 1250 nm or less, or about 1240 nm or less, or about 1230 nm or less, or about 1220 nm or less, or about 1210 nm or less, or about 1205 nm or less, or about 1200 nm or less, or about 1195 nm or less, or about 1190 nm or less, or about 1185 nm or less, or about 1180 nm or less, or about 1175 nm or less, or about 1170 nm or less. For example, the effective cutoff wavelength of the LP11 mode is about 1389 nm, or about 1321 nm, or about 1303 nm, or about 1243 nm, or about 1271 nm, or about 1214 nm.

The effective cutoff wavelength of the LP02 mode of cores 30 disclosed herein is about 1000 nm or less, or about 950 nm or less, or about 900 nm or less, or about 850 nm or less, or about 800 nm or less. For example, the effective cutoff wavelength of the LP02 mode is about 911 nm, or about 904 nm, or about 844 nm, or about 839 nm, or about 830 nm, or about 791 nm, or about 773 nm.

According to aspects of the present disclosure, cores 30 have a dispersion at 1310 nm in a range between about −2.5 ps/nm/km and about 1.0 ps/nm/km. For example, the dispersion at 1310 nm is from about −2.0 ps/nm/km to about 0.8 ps/nm/km, or about −1.8 ps/nm/km to about 0.5 ps/nm/km. In some embodiments, the dispersion at 1310 is about −2.66 ps/nm/km, or about −2.23 ps/nm/km, or about −0.96 ps/nm/km, or about −0.86 ps/nm/km, or about −0.385 ps/nm/km, or about 0.638.

The dispersion slope of cores 30 at 1310 nm wavelength is in a range between about 0.015 ps/nm²/km and 0.1 ps/nm²/km. For example, the dispersion slope at 1310 nm is about 0.02 ps/nm²/km to about 0.095 ps/nm²/km, about 0.025 ps/nm²/km to about 0.09 ps/nm²/km, or about 0.03 ps/nm²/km to about 0.085 ps/nm²/km. In some embodiments, the dispersion slope at 1310 nm is about 0.0854 ps/nm²/km, or about 0.0858 ps/nm²/km, or about 0.0874 ps/nm²/km, or about 0.0870 ps/nm²/km, or about 0.0877 ps/nm²/km, or about 0.0888 ps/nm²/km.

According to aspects of the present disclosure, cores 30 have a dispersion at 1550 nm of less than about 22 ps/nm/km. For example, the dispersion at 1550 nm is from about 10 ps/nm/km to about 22 ps/nm/km, or about 10 ps/nm/km to about 15 ps/nm/km, or about 15 ps/nm/km to about 22 ps/nm/km, or about 15 ps/nm/km to about 20 ps/nm/km. For example, the dispersion at 1550 is about 14.11 ps/nm/km, or about 14.61 ps/nm/km, or about 15.643 ps/nm/km, or about 16.15 ps/nm/km, or about 16.17 ps/nm/km, or about 17.46 ps/nm/km, or about 17.546 ps/nm/km.

The dispersion slope of cores 30 at 1550 nm wavelength is in a range between about 0.015 ps/nm²/km and 0.1 ps/nm²/km. In some examples, the dispersion slope at 1550 nm is about 0.04 ps/nm²/km to about 0.1 ps/nm²/km, or about 0.05 ps/nm²/km to about 0.1 ps/nm²/km, or about 0.055 ps/nm²/km to about 0.1 ps/nm²/km, or about 0.06 ps/nm²/km to about 0.1 ps/nm²/km, or about 0.08 ps/nm²/km to about 0.1 ps/nm²/km, or about 0.04 ps/nm²/km to about 0.08 ps/nm²/km, or about 0.05 ps/nm²/km to about 0.08 ps/nm²/km, or about 0.055 ps/nm²/km to about 0.08 ps/nm²/km, or about 0.06 ps/nm²/km to about 0.08 ps/nm²/km, or about 0.04 ps/nm²/km to about 0.06 ps/nm²/km, or about 0.05 ps/nm²/km to about 0.06 ps/nm²/km, or about 0.0569 ps/nm²/km, or about 0.0571 ps/nm²/km, or about 0.0579 ps/nm²/km, or about 0.0580 ps/nm²/km, or about 0.0583 ps/nm²/km, or about 0.0584 ps/nm²/km, or about 0.0589 ps/nm²/km.

Additionally cores 30 have zero dispersion wavelength from about 1290 nm to about 1330 nm. For example, the zero dispersion wavelength can be from about 1295 nm to about 1325 nm, or about 1300 nm to about 1324 nm, or about 1305 nm to about 1315 nm. For example, the zero dispersion wavelength can be about 1302.70 nm, or about 1303.93 nm, or about 1314.49 nm, or about 1320.04 nm, or about 1320.82 nm, or about 1335.51 nm, or about 1340.56 nm.

The couplers disclosed herein provide low insertion loss when coupling single-core fibers with a multi-core fiber. For example, the coupling loss may be reduced by about 20% or greater, or about 30% or greater, or about 40% or greater, or about 50% or greater, or about 60% or greater, or about 70% or greater, or 80% or greater, or 90% or greater, or 95% or greater, or 99% or greater as compared with traditional fan-in/fan-out devices. Coupler 10 may provide an insertion loss of about 1 db or less, or about 0.8 db or less, or about 0.75 db or less, or about 0.6 db or less, or about 0.5 db or less, or about 0.4 db or less, or about 0.3 db or less when coupling single-core optical fibers 31 to multi-core optical fiber 20. In some embodiments, coupler 10 provides an insertion loss in a range from about 0.3 db to about 1 db or about 0.4 to about 0.8 db. It is noted that the couplers disclosed herein provide such low insertion loss at both first end 12 and second end 14 of coupler 10.

As discussed above, traditional fan-in/fan-out devices are formed of a plurality of discrete fibers 110 that are bundled together, such as device 100 shown in FIG. 4. The fibers are fused together at the end of the device that couples to a multi-core optical fiber. However, the separate fibers are not fused together at the end of the device that couples to the single-core fibers and, instead, remain as separate and discrete fibers that diverge outward at this end. Each diverging fiber 110 of the traditional fan-in/fan-out device must be carefully and precisely aligned with the core of a single-core fiber. Furthermore, the cores of the fused fibers must be carefully aligned with the cores of the multi-core fiber. Such can be very difficult to achieve. For example, precise positioning of the cores in the fused fibers is difficult to achieve when the discrete fiber elements are bundled together. Thus, the traditional fan-in/fan-out devices typically have poor alignment with the multi-core fibers and with the single-core fiber.

However, in contrast to the traditional fan-in/fan-out devices, the couplers disclosed herein are formed of a unitary, conical glass member with a single common cladding that extends from the first end to the second end of the coupler. By forming the couplers as a unitary, conical glass member, the location of the cores within the coupler can be precisely controlled during the manufacturing process. Therefore, the location of the cores of the coupler can be manufactured to precisely align with the location of the cores of the single-core fibers and the location of the cores of the multi-core fiber. Such allows for very accurate alignment between the cores of the coupler and the cores of the single-core and multi-core fibers. Due to such accurate alignment, the couplers disclosed herein have significantly smaller lateral misalignment with the cores to which they are coupled and a high coupling coefficient with the single-core and multi-core fibers, which provides low insertion loss. Thus, the couplers disclosed herein optically couple with the single-core and multi-core optical fibers with very little coupling loss. The taper of the coupler from its first end to second end allows the coupler to optically couple with the fibers with such a high coupling coefficient.

Provided below are exemplary embodiments of coupler 10 disclosed herein. The below examples are intended to be exemplary and are not intended to limit the scope of the disclosure.

TABLE 1

|  | Exemplary Fiber 1 | | Exemplary Fiber 2 | |
| --- | --- | --- | --- | --- |
|  | First End 12 | Second End 14 | First End 12 | Second End 14 |
| Redraw Ratio | 8.89 | 8.89 | 12.5 | 12.5 |
| Core Configuration | 2 × 2 | 2 × 2 | 2 × 2 | 2 × 2 |
| Core Relative Refractive Index ($\Delta$ (%)) | 0.68 | 0.68 | 0.72 | 0.72 |
| Core Radius (microns) | 4.6 | 0.5175 | 4.2 | 0.4305 |
| Core Alpha | 12 | 12 | 12 | 12 |
| Distance between Center of Core and Center of Coupler (microns) | 355.6 | 40 | 500 | 40 |
| Inner Cladding Relative Refractive Index ($\Delta$ (%)) | 0.34 | 0.34 | 0.36 | 0.36 |
| Inner Cladding Radius (microns) | 40 | 4.5 | 52.5 | 4.1 |
| Outer Cladding Relative Refractive Index ($\Delta$ (%)) | 0 | 0 | 0 | 0 |
| Outer Cladding Radius (microns) | 555.62 | 62.5 | 781.25 | 62.5 |
| Mode Field Diameter at 1310 nm (microns) | 9.15 | 9.16 | 8.72 | 8.73 |
| Mode Field Diameter at 1550 nm (microns) | 10.38 | 10.32 | 10 | 9.94 |
| Effective Area at 1310 nm (microns$^2$) | 65.91 | 66.35 | 59.18 | 59.74 |
| Effective Area at 1550 nm (microns$^2$) | 82.42 | 81.95 | 75.82 | 75.28 |
| LP11 Cutoff (nm) | 1321 | 1389 | 1243 | 1303 |
| LP02 cutoff (nm) | 839 | 904 | 791 | 844 |
| Cable Cutoff (nm) | 1171 | 1239 | 1093 | 1153 |
| Dispersion at 1310 nm (ps/nm/km) | −0.96 | 0.638 | −2.23 | −0.385 |
| Dispersion Slope at 1310 nm (ps/nm^2/km) | 8.88E−02 | 8.74E−02 | 8.74E−02 | 8.58E−02 |
| Zero Dispersion Wavelength | 1320.82 | 1302.70 | 1335.51 | 1314.49 |
| Dispersion at 1550 nm (ps/nm/km) | 16.15 | 17.546 | 14.61 | 16.17 |
| Dispersion Slope at 1550 nm (ps/nm^2/km) | 5.89E−02 | 5.83E−02 | 5.80E−02 | 5.71E−02 |
| Coupler Length (mm) | >2 mm | >2 mm | >2 mm | >2 mm |

TABLE 2

|  | Exemplary Fiber 3 | | Exemplary Fiber 4 | |
| --- | --- | --- | --- | --- |
|  | First End 12 | Second End 14 | First End 12 | Second End 14 |
| Redraw Ratio | 7.96 | 7.96 | 8.74 | 8.74 |
| Core Configuration | 2 × 2 | 2 × 2 | 2 × 2 | 2 × 2 |
| Core Relative Refractive Index ($\Delta$ (%)) | 0.68 | 0.68 | 0.72 | 0.72 |

TABLE 2-continued

|  | Exemplary Fiber 3 | | Exemplary Fiber 4 | |
| --- | --- | --- | --- | --- |
|  | First End 12 | Second End 14 | First End 12 | Second End 14 |
| Core Radius (microns) | 4.6 | 0.578 | 4.1 | 0.469 |
| Core Alpha | 12 | 12 | 12 | 12 |
| Distance between Center of Core and Center of fiber (microns) | 318.4 | 40 | 349.6 | 40 |
| Inner Cladding Relative Refractive Index ($\Delta$ (%)) | 0.34 | 0.34 | 0.36 | 0.36 |
| Inner Cladding Radius (microns) | 35 | 4.5 | 35 | 4 |
| Outer Cladding Relative Refractive Index ($\Delta$ (%)) | 0 | 0 | 0 | 0 |
| Outer Cladding Radius (microns) | 491.25 | 62.5 | 546.25 | 62.5 |
| Mode Field Diameter at 1310 nm (microns) | 9.15 | 9.12 | 8.66 | 8.64 |
| Mode Field Diameter at 1550 nm (microns) | 10.38 | 10.28 | 9.98 | 9.87 |
| Effective Area at 1310 nm (microns$^2$) | 65.91 | 65.56 | 58.17 | 58.06 |
| Effective Area at 1550 nm (microns$^2$) | 82.42 | 81.16 | 75.3 | 73.95 |
| LP11 Cutoff (nm) | 1321 | 1389 | 1214 | 1271 |
| LP02 cutoff (nm) | 839 | 911 | 773 | 830 |
| Cable Cutoff (nm) | 1171 | 1239 | 1064 | 1121 |
| Dispersion at 1310 nm (ps/nm/km) | −0.96 | 0.532 | −2.6591 | −0.858 |
| Dispersion Slope at 1310 nm (ps/nm^2/km) | 8.87E−02 | 8.77E−02 | 8.70E−02 | 8.54E−02 |
| Zero Dispersion Wavelength | 1320.82 | 1303.93 | 1340.56 | 1320.04 |
| Dispersion at 1550 nm (ps/nm/km) | 16.15 | 17.46 | 14.11 | 15.643 |
| Dispersion Slope at 1550 nm (ps/nm^2/km) | 5.89E−02 | 5.84E−02 | 5.79E−02 | 5.69E−02 |
| Coupler Length (mm) | >2 mm | >2 mm | >2 mm | >2 mm |

TABLE 3

|  | Exemplary Fiber 5 | |
| --- | --- | --- |
|  | First End 12 | Second End 14 |
| Redraw Ratio | 9 | 9 |
| Core Configuration | 1 × 4 | 1 × 4 |
| Core Relative Refractive Index ($\Delta$ (%)) | 0.68 | 0.68 |
| Core Radius (microns) | 4.6 | 0.5175 |
| Core Alpha | 12 | 12 |
| Distance between Center of Adjacent Cores (microns) | 238.5 | 26.5 |
| Inner Cladding Relative Refractive Index ($\Delta$ (%)) | 0.34 | 0.34 |
| Inner Cladding Radius (microns) | 42.6 | 4.6 |
| Outer Cladding Relative Refractive Index ($\Delta$ (%)) | 0 | 0 |
| Outer Cladding Radius (microns) | 562.5 | 62.5 |
| Mode Field Diameter at 1310 nm (microns) | 9.15 | 9.16 |
| Mode Field Diameter at 1550 nm (microns) | 10.38 | 10.32 |
| Effective Area at 1310 nm (microns$^2$) | 65.91 | 66.35 |
| Effective Area at 1550 nm (microns$^2$) | 82.42 | 81.95 |
| LP11 Cutoff (nm) | 1321 | 1389 |
| LP02 cutoff (nm) | 839 | 904 |
| Cable Cutoff (nm) | 1171 | 1239 |
| Dispersion at 1310 nm (ps/nm/km) | −0.96 | 0.638 |
| Dispersion Slope at 1310 nm (ps/nm^2/km) | 8.88E−02 | 8.74E−02 |
| Zero Dispersion Wavelength | 1320.82 | 1302.70 |
| Dispersion at 1550 nm (ps/nm/km) | 16.15 | 17.546 |
| Dispersion Slope at 1550 nm (ps/nm^2/km) | 5.89E−02 | 5.83E−02 |
| Coupler Length (mm) | >2 mm | >2 mm |

TABLE 4

| | Exemplary Fiber 6 | |
| --- | --- | --- |
| | First End 12 | Second End 14 |
| Redraw Ratio | 9.5 | 9.5 |
| Core Configuration | Hexagonal 6 core | Hexagonal 6 core |
| Core Relative Refractive Index ($\Delta$ (%)) | 0.72 | 0.72 |
| Core Radius (microns) | 4.1 | 0.4305 |
| Core Alpha | 12 | 12 |
| Distance between Center of Core and Center of fiber (microns) | 380 | 40 |
| Inner Cladding Relative Refractive Index ($\Delta$ (%)) | 0.36 | 0.36 |
| Inner Cladding Radius (microns) | 39 | 4.1 |
| Outer Cladding Relative Refractive Index ($\Delta$ (%)) | 0 | 0 |
| Outer Cladding Radius (microns) | 593.8 | 62.5 |
| Mode Field Diameter at 1310 nm (microns) | 8.72 | 8.73 |
| Mode Field Diameter at 1550 nm (microns) | 10 | 9.94 |
| Effective Area at 1310 nm (microns$^2$) | 59.18 | 59.74 |
| Effective Area at 1550 nm (microns$^2$) | 75.82 | 75.28 |
| LP11 Cutoff (nm) | 1243 | 1303 |
| LP02 cutoff (nm) | 791 | 844 |
| Cable Cutoff (nm) | 1093 | 1153 |
| Dispersion at 1310 nm (ps/nm/km) | −2.23 | −0.385 |
| Dispersion Slope at 1310 nm (ps/nm^2/km) | 8.74E−02 | 8.58E−02 |
| Zero Dispersion Wavelength | 1335.51 | 1314.49 |
| Dispersion at 1550 nm (ps/nm/km) | 14.61 | 16.17 |
| Dispersion Slope at 1550 nm (ps/nm^2/km) | 5.80E−02 | 5.71E−02 |
| Coupler Length (mm) | >2 mm | >2 mm |

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A coupler comprising:
   a first end configured to optically couple with a plurality of single-core optical fibers;
   a second end configured to optically couple with a multi-core optical fiber;
   a plurality of cores that each extends from the first end to the second end,
      the plurality of cores comprising a first core such that an outer diameter of the first core at the first end is larger than an outer diameter of the first core at the second end,
      the first core comprising a relative refractive index $\Delta_{01maxA}$ at the first end from 0.6% $\Delta$ to 0.8% $\Delta$ and the first core comprising a relative refractive index $\Delta_{1maxB}$ at the second end from 0.5% $\Delta$ to 1.0% $\Delta$ relative to the refractive index of pure silica, and
      the first core comprising a mode field diameter, at 1550 nm wavelength, of 9.5 microns or greater; and
   an outer cladding surrounding the plurality of cores and extending from the first end to the second end such that an outer diameter of the outer cladding at the first end is larger than an outer diameter of the outer cladding at the second end, the outer cladding comprising a relative refractive index $\Delta_{OE}$ from −0.20% $\Delta$ to 0.20% $\Delta$ at the first end and at the second end relative to the refractive index of pure silica,
   wherein the coupler comprises a single, contiguous, conical glass member that tapers from the first end to the second end.

2. The coupler of claim 1, wherein a ratio of the outer diameter of the first core at the first end to the outer diameter of the first core at the second end is from 6 to 14.

3. The coupler of claim 1, wherein a radius of the first core at the first end is from 3 microns to 10 microns.

4. The coupler of claim 3, wherein the radius of the first core at the first end is from 4 microns to 8 microns.

5. The coupler of claim 1, wherein a radius of the first core at the second end is from 0.4 microns to 1 micron.

6. The coupler of claim 5, wherein the radius of the first core at the second end is from 0.5 microns to 0.9 microns.

7. The coupler of claim 1, further comprising an inner cladding disposed radially between the first core and the outer cladding.

8. The coupler of claim 7, wherein a relative refractive index of the inner cladding at the first end and the second end is from 0.2% $\Delta$ to 0.5% $\Delta$.

9. The coupler of claim 7, wherein a radius of the inner cladding at the first end is 35 microns or greater.

10. The coupler of claim 7, where a radius of the inner cladding at the second end is from 3 microns to 6 microns.

11. The coupler of claim 1, wherein an alpha value of the core is 10 or greater.

12. The coupler of claim 1, wherein a redraw ratio of the coupler is from 3 to 20.

13. The coupler of claim 1, wherein a length of the coupler is 25 mm or less.

14. The coupler of claim 1, wherein a mode field diameter of the first core at 1310 nm wavelength is 8.9 microns or greater.

15. A coupler comprising:
   a first end configured to optically couple with a plurality of single-core optical fibers;
   a second end configured to optically couple with a multi-core optical fiber;
   a core that extends from the first end to the second end such that an outer diameter of the core at the first end is larger than an outer diameter of the core at the second end;
   an inner cladding surrounding the core and extending from the first end to the second end; and
   an outer cladding surrounding the core and the inner cladding and extending from the first end to the second end such that an outer diameter of the outer cladding at the first end is larger than an outer diameter of the outer cladding at the second end,
   wherein:
      a relative refractive index of the core at the first end and at the second end is from 0.6% $\Delta$ to 0.8% $\Delta$,
      a relative refractive index of the inner cladding at the first end and the second end is from 0.2% $\Delta$ to 0.5% $\Delta$, and a relative refractive index of the outer cladding at the first end and the second end is from −0.20% Δ to 0.20% Δ.

16. The coupler of claim 15, wherein a radius of the core at the first end is from 3 microns to 10 microns.

17. The coupler of claim 15, wherein a radius of the core at the second end is from 0.4 microns to 1 micron.

* * * * *